United States Patent [19]

Terada et al.

[11] Patent Number: 5,170,224
[45] Date of Patent: Dec. 8, 1992

[54] LASER WAVELENGTH MEASURING DEVICE

[75] Inventors: Mitsugu Terada; Ken Ohmata, both of Kimitsu; Kazuo Shimazaki, Chiyoda; Yasuo Oeda; Yuichiro Terashi, both of Kimitsu, all of Japan

[73] Assignee: Mitsui Petrochemical Industries, Ltd., Tokyo, Japan

[21] Appl. No.: 604,635

[22] Filed: Oct. 29, 1990

[30] Foreign Application Priority Data

Oct. 30, 1989 [JP] Japan .................. 1-282726

[51] Int. Cl.$^5$ .................. G01J 3/45; G01N 21/25; H01S 3/13
[52] U.S. Cl. .................. 356/346; 356/419; 372/32
[58] Field of Search ............. 356/319, 256, 326-328, 356/329-334, 416, 419, 352, 346; 372/32, 20; 200/226; 342/192

[56] References Cited

U.S. PATENT DOCUMENTS 3,999,864 12/1976 Mutter .................. 356/416

FOREIGN PATENT DOCUMENTS 0165022 9/1983 Japan .................. 356/319

Primary Examiner—F. L. Evans
Assistant Examiner—K. P. Hantis
Attorney, Agent, or Firm—Sherman and Shalloway

[57] ABSTRACT

This invention is provided with a wavelength selecting means for uses in selectively receiving beam in compliance with each of a reference beam and a measured beam in order to simplify a correction or comparison of oscillating wavelengths in the laser device and further to improve a reliability and a controlling responsive speed.

9 Claims, 2 Drawing Sheets

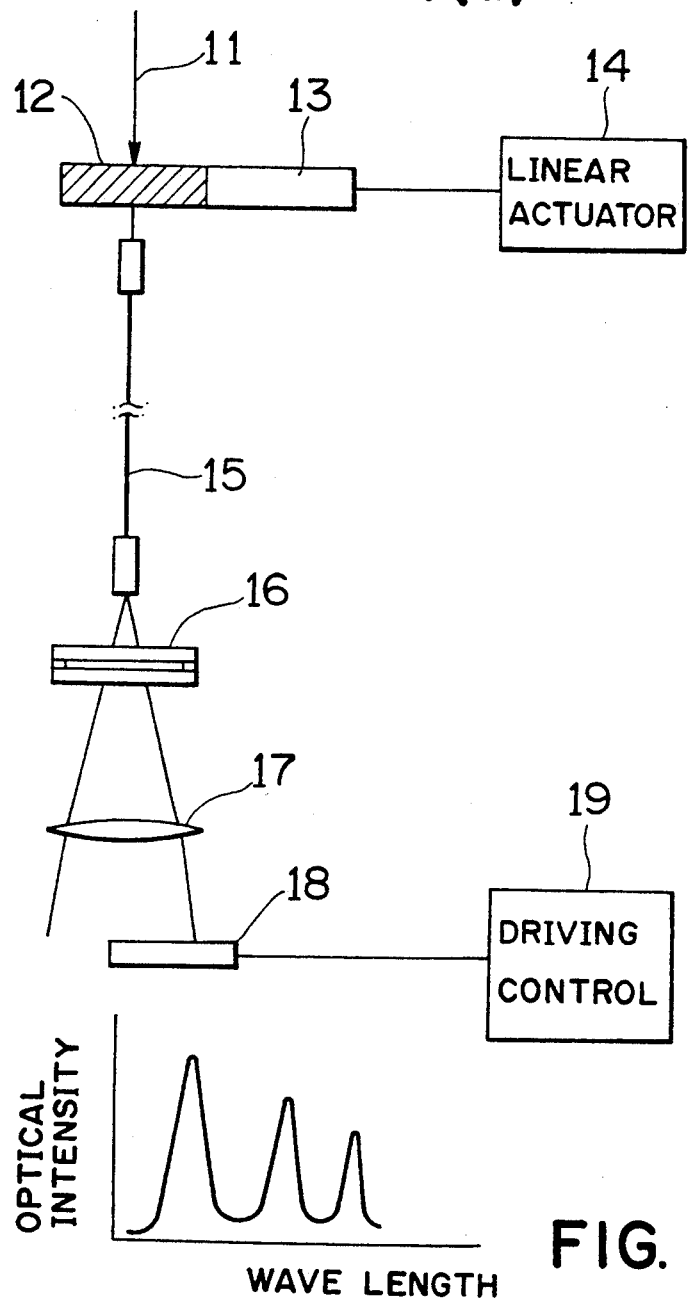

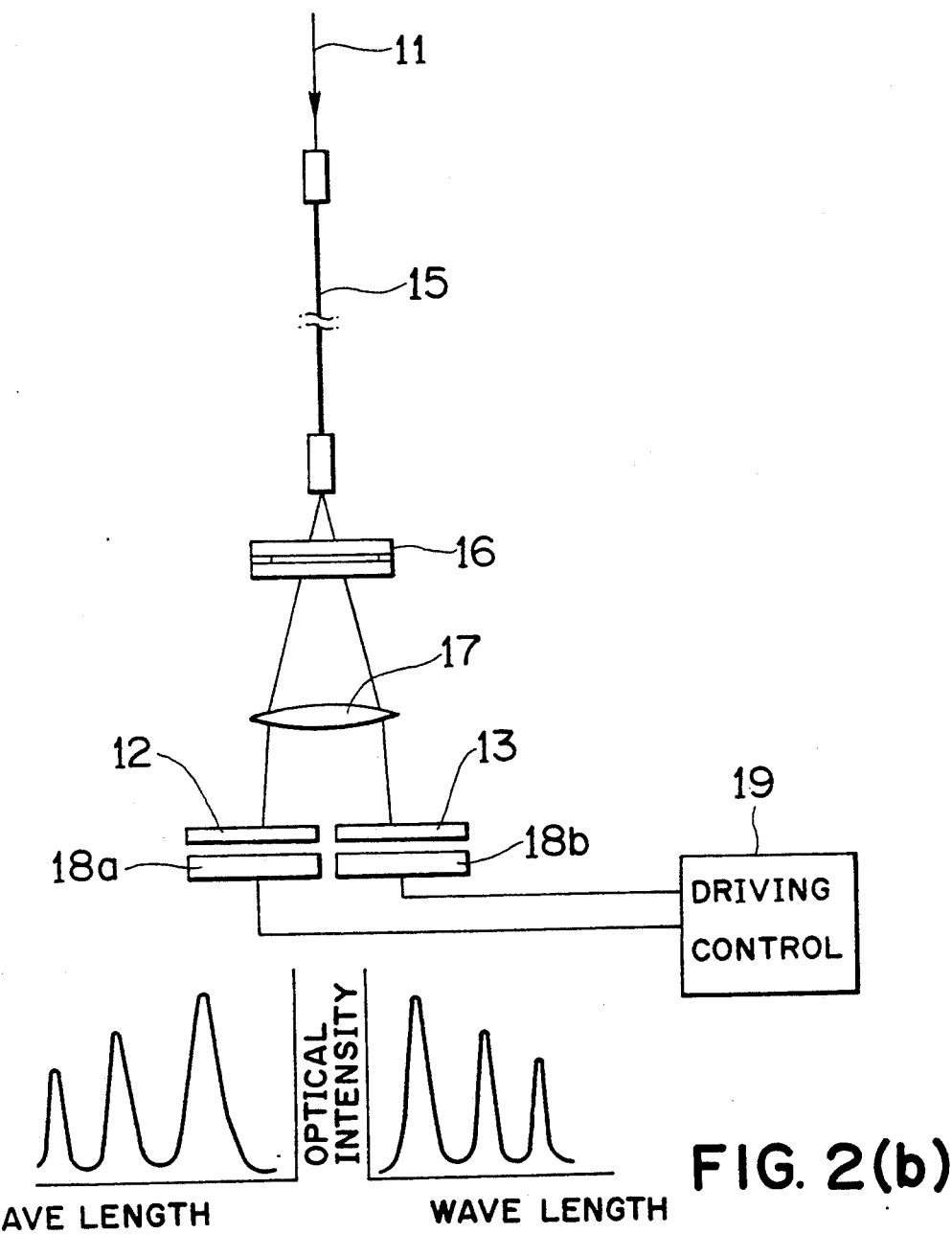

LASER WAVELENGTH MEASURING DEVICE

BACKGROUND OF THE INVENTION

This invention relates to an effective technology which is applied to a laser wavelength measuring device to be used in correcting a displaced laser wavelength in a laser device.

A laser beam has some features of a coherent high wavelength purity and a high output or the like and has been applied as an effective light source capable of giving a high beam radiation. In recent years, there has been developed a light source device utilizing such a laser beam. A typical device is a narrow band excimer laser which is studied as a light source for a lithography used in an ultra-reduced projecting and exposure process applied in a semiconductor device manufacturing step.

In this type of laser device applied to this kind of application, it was necessary to always monitor a displacement of wavelength of the projected laser beam in order to stabilize the laser oscillation wavelength so as to perform a feed-back control of the laser oscillation device.

As a configuration of the measuring device in such a monitor system, it was a usual process to change a radiated laser beam into a dispersion light formed into some spectrum with a spectrum analyzer such as etalon or the like and then to receive the light with a light receiving element such as a photo-detector array or the like. In this case, the aforesaid etalon is a wavelength selecting element in which multiple reflection and interference phenomena produced between a pair of reflection films are applied, and it has a function to radiate an incident light onto the light receiving element in an interference stripe. The aforesaid photo-detector array is defined as one in which light receiving elements such as photodiodes or the like are arranged in a linear direction and a distribution of intensity of light is detected by monitoring an electric current generated under an optical excited state in each of the light receiving elements.

The aforesaid etalon shows a substantial variation in its characteristic in response to a variation of temperature and atmospheric pressure in an applied environment or the like. In the prior art, it was a usual practice to store the etalon applied to such an application described above in an air-sealed container of which temperature and air pressure are kept constant. In addition, a light having a reference wavelength (a reference light) was simultaneously received together with a laser beam from the laser device acting as a measured beam in response to the aforesaid variation in characteristic so as to compare both wavelengths and to detect a displacement of the wavelengths and then the feed-back control was carried out in reference to this data.

However, as described above, in case where the measured beam and the reference beam are received by the same optical path, the aforesaid photo-detector array measurement produces a relatively easy detection of a position of the maximum intensity, its signal processing for the measured beam and the reference beam not only became quite complicated, but also its processing speed was reduced and a controlling characteristic was apt to be deteriorated. That is, in case that the measured beam and the reference beam were radiated simultaneously, the measured beams and the reference beam should be discriminated in reference to the signal from the photo-detector array and the calculation process of many steps was required in order to compare the difference at both central wavelength positions.

SUMMARY OF THE INVENTION

It is an object of the present invention to provide a technology capable of simplifying a correction of an oscillating wavelength in its laser device, improving a reliability and further improving the speed of control response.

The present invention is constructed as follows to make a laser wavelength measuring device which measures a wavelength of the beam by making a spectrum beam of an incident laser beam with a beam splitter, and irradiating against a measuring element to measure the wavelength.

That is, there is provided a wavelength selecting means for selectively receiving only either one of the reference beam and the measured beam in response As an embodiment of the aforesaid wavelength selecting means, both a filter for passing only the reference beam, for example, and a filter for passing only the measured beam, are used in combination with a spectrum analyzer (e.g., etalon) and then they are selectively changed over on optical path.

In an alternative embodiment of the aforesaid wavelength selecting means, for example, the measuring elements having sensitivities in each of the wavelength bands of the reference beam and the measured beam are prepared and then the measurement of wavelength of each of the beams is carried out with a separate measuring element.

According to the aforesaid means, only one maximum intensity position on the photo-detector array may be detected in compliance with the selected reference beam or the measured beam in case of performing the measurement per one unit, resulting in that a signal processing system is also simplified and a feed-back control with a high response characteristic can be attained.

In addition, since the filter arranged on the same optical path as the wavelength selecting means is arranged to be changed over, when the wavelength of either the reference beam or the measured beam is to be detected, the other beam is shielded by the other filter and thus the wavelength can be detected without being interfered with by other beams and further a detecting accuracy can also be increased.

As the wavelength selecting means, of aforementioned second embodiment each of the two measuring elements having a sensitivity in each of the wavelength ranges of the reference beam and the measured beam is prepared, thereby a simultaneous and easy wavelength detection for each of the beams can be attained.

According to the present invention, it is possible to make a fast detection of a displacement of the wavelengths of the laser beam radiated from the laser device and to improve a control responsive speed.

BRIEF DESCRIPTION OF THE DRAWINGS

FIGS. 1 and 2 illustrate the preferred embodiments of the present invention.

FIG. 1(a) is a schematic configuration figure for showing a laser wavelength measuring device of the preferred embodiment 1.

FIG. 1(b) is a graph for showing a characteristic of its wavelength.

FIG. 2(a) is a schematic configuration for showing a laser wavelength measuring device of the preferred embodiment 2.

FIG. 2(b) is a graph for showing a characteristic of its wavelength.

DESCRIPTION OF THE PREFERRED EMBODIMENTS

Referring now to the drawings, some preferred embodiments of the present invention will be described.

First Preferred Embodiment

FIGS. 1(a) and (b) illustrate a schematic configuration of the laser wavelength measuring device of the preferred embodiment of the present invention and a characteristic of the detected wavelength.

That is, in these figures, as the measured beam and the reference beam are incident as an incident beam 11 on the same optical path, the beam passes through a filter 12 or 13, passes through an optical fiber cable 15 and reaches a spectrum analyzer, such as etalon 16, through the optical fiber cable 15, divided there and further the beams pass through the lens 17 and are radiated onto a photo-detector array 18 acting as the measuring element.

In this case, the filter 12 has an optical characteristic of transparency in a wavelength region of the reference beam and having no transparency characteristic in the wavelength region of the measured beam. The filter 13 in turn has an optical characteristic of transparency in the wavelength region of the measured beam and having no transparency characteristic in the wavelength region of the reference beam. Both filters 12 and 13 are continuously connected to each other, they can be moved linearly in a direction crossing with the optical path by a linear actuator 14 and only one of the filter 12 or 13 is selectively arranged on the optical path.

The photo-detector array 18 is connected to a driving control part 19 acting as a driving mechanism and a signal input/output part. This driving control part 19 may perform a signal processing from the photodetector array 18 and detect a central wavelength position.

With such a device configuration described above, at first in case that the wavelength of the reference beam is to be detected, the actuator 14 is driven so as to cause the filter 12 to be arranged on the optical path. In this way, the filter 12 is arranged on the optical path, thereby only the reference beam is radiated onto the photo-detector array 18. At this time, the strongest central wavelength position is stored in a memory part (not illustrated) in a driving control part 19.

Then, the actuator 14 is driven, and in this case, the filter 13 is arranged on the optical path. Under this condition, only the measured beam passes through the filter 13 and is radiated onto the photo-detector array 18. In this way, the strongest central wavelength position got through the radiation of the measured beam is stored in the aforesaid driving control part 19 and subsequently the central wavelength position by the preceding reference beam is compared with the central wavelength position of the present measured beam.

As a result, in case where there is a certain displacement in both strongest central wavelength positions, its difference is calculated and then a laser oscillating part (not shown) is controlled in response to the difference data. The correction of such a displacement of laser oscillation wavelengths is practically carried out with a variation of inclined angle on the laser optical path for the etalon (not shown) stored in the laser oscillation part.

In this way, in the preferred embodiment, the measured beam is shielded by the filter 12 when the reference beam of the photo-detector array 18 is received, resulting in that there is influence caused by the receiving of the beam from other wavelength regions and that is, the strongest wavelength data of the reference light can be easily received without carrying out the discrimination of the wavelength signal.

Similarly, when the measured beam is received, the strongest wavelength data of the measured beam can be accurately and easily be attained by use of the filter 13.

Preferred Embodiment 2

Referring now to FIG. 2 another preferred embodiment of the present invention will be described.

In this preferred embodiment, filters 12 and 13 are fixedly arranged between the lens 17 and the photo-detector arrays 18a and 18b. The filters 12 and 13 are symmetrically arranged around the reference vertical axis of the lens 17, respectively.

As described in reference to the aforesaid preferred embodiment 1, since the filters 12 and 13 have a characteristic of transparency of only the reference beam or only the measured beam, respectively, the wavelength characteristic of the reference beam is detected at the photo-detector arrays 18a and the wavelength characteristic of the measured beam is detected by the photo-detector array 18b. These characteristics are graphically illustrated in FIG. 2(b) and further each of the photo-detector arrays 18a and 18b is arranged at a symmetrical position around the central axis of the lens, respectively, so their wavelength characteristics are substantially symmetrical.

At the driving control part 19, signals from both photo-detector arrays 18a and 18b are synchronized at a reference clock timing to make a simultaneous comparison to each other, thereby in case where there is a certain displacement in the central wavelength position, its difference is calculated and the laser oscillating part (16 is) controlled in response to the difference data. This comparison and correction of such a displacement of laser oscillation wavelength is carried out by the same manner as described in the preferred embodiment 1 by varying an inclination angle of the etalon (not shown) stored in the laser oscillation part on the laser optical path.

In this way, in the preferred embodiment 2, the reference beam and the measured beam are simultaneously received to enable their comparison to be carried out, resulting in that a higher fast responding wavelength control can be attained.

What is claimed is:

1. A device for measuring the wavelength of an incident beam of laser light irradiated along an optical path, said incident beam comprising a reference beam having a first wavelength region and a measured beam having a second wavelength region, said device comprising
    a first filter means having an optical characteristic of being transparent to light in said first wavelength region,
    a second filter means having an optical characteristic of being transparent to light in said second wavelength region,
    a spectrum analyzer in the optical path of the incident beam, and located behind, in the direction of travel of the incident beam, said first and second filter means, said spectrum analyzer converting said incident beam into a spectrum beam, means for placing alternatively said first filter means and said second filter means in the optical path of said incident light, whereby only either the reference beam or the measured beam alternatively impinges on and passes through said spectrum analyzer, and a measuring element for measuring a wavelength of the spectrum beam of light transmitted by the spectrum analyzer.

2. The measuring device of claim 1, wherein said first and second filter means are connected to each other in a side-by-side arrangement and said placing means comprises a linear actuator for linearly moving said first and second filter means in a direction crossing the optical path of said incident beam such that only one of said first and second filter means is selectively arranged in the optical path.

3. The measuring device of claim 1 which further comprises an optical fiber cable for receiving and transmitting the reference beam or the measured beam passing through the first filter means or second filter means, respectively, from the first or second filter means to the spectrum analyzer.

4. The measuring device of claim 1 wherein said measuring element comprises a photodetector array.

5. A device for measuring the wavelength of an incident beam of laser light irradiated along an optical path, said incident beam comprising a reference beam having a first wavelength region and a measured beam having a second wavelength region, said device comprising, in the optical path of the incident beam, a spectrum analyzer for forming a spectrum beam from said incident beam, a first filter means which is transparent to light in said first wavelength region, and located to filter light from said spectrum beam, a second filter means which is transparent to light in said second wavelength region, and located, spaced apart from said first filter means, to filter light from said spectrum beam, a first measuring element for receiving and measuring the wavelength of filtered light passing through said first filter means, and a second measuring element for receiving and measuring the wavelength of filtered light passing through said second filter means.

6. The measuring device of claim 5 which further comprises a lens having a reference vertical axis for receiving the spectrum beam from said spectrum analyzer and transmitting light to said first and second filter means.

7. The measuring device of claim 6 wherein said first filter means and said first measuring element and said second filter means and said second measuring element are arranged symmetrically on either side of said reference vertical axis.

8. The measuring device of claim 7 which further comprises means for detecting and comparing the wavelengths measured by said first and second measuring elements.

9. The measuring device of claim 8 wherein the first and second measuring elements each comprise a photodetector array.

* * * * *